Oct. 9, 1956 R. PETH 2,766,324

SWITCHING SYSTEM

Filed Dec. 18, 1951

2 Sheets-Sheet 1

INVENTOR.
Robert Peth
BY Foorman L. Mueller
Atty

Oct. 9, 1956 R. PETH 2,766,324

SWITCHING SYSTEM

Filed Dec. 18, 1951

2 Sheets-Sheet 2

INVENTOR.
Robert Peth

BY Foorman L. Mueller
Atty.

United States Patent Office 2,766,324
Patented Oct. 9, 1956

2,766,324

SWITCHING SYSTEM

Robert Peth, Chicago, Ill., assignor to Motorola, Inc., Chicago, Ill., a corporation of Illinois Application December 18, 1951, Serial No. 262,303

13 Claims. (Cl. 179—15.5)

Figure 1:
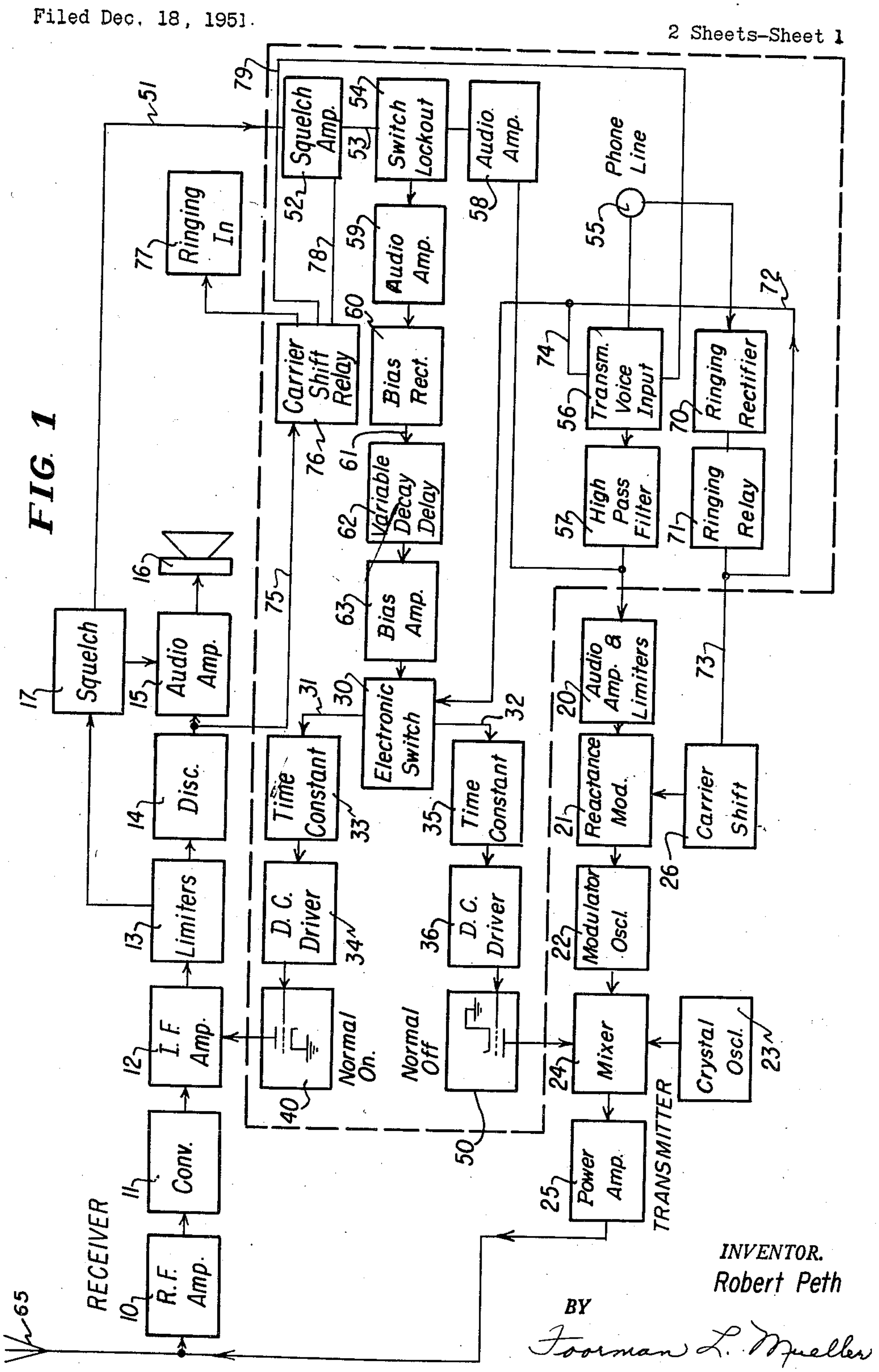

The present invention relates generally to communication networks and more particularly to a control system for providing automatic simplex operation in a communication network having all transmitters and receivers utilizing the same channel.

Communication networks providing for local and remote stations, each including a transmitter and receiver are widely used. Many of such networks use transmitters and receivers operating with frequency modulated signals impressed on a power line carrier frequency. It has been previously proposed to equip the frequency modulation receivers of such systems with audio squelch circuits to mute the audio reproducing portions of the receiver when a carrier signal is not received to thereby prevent reproduction of undesired noise and the like. Under certain conditions, it may be desirable to use simplex operation of the network, with all receivers and transmitters tuned to the same carrier center frequency. It is desirable that the simplex operation be obtained automatically in a manner to prevent simultaneous operation of the transmitter and receiver at any communication station and so that an active transmitter may automatically and instantaneously control all of the transmitters and receivers during the transmitting period.

It is therefore an object of the present invention to provide a simple and reliable communication network control system enabling automatic simplex operation for all transmitters and receivers on the same frequency of operation or the same frequency modulation communication channel.

It is also an object of the present invention to provide an improved control system for a communication network that may be automatically responsive to the voice frequencies to be transmitted to thereby control the network.

Yet another object of the invention is to provide a voice responsive switching system to control a communication network in a manner such that all receivers are normally on in a standby receiving condition so that a carrier signal may be received to lock the switching system in the receiving condition with the receiver on and the transmitter off.

A further object of the invention is to provide a voice frequency responsive switching system enabling automatic simplex operation of a frequency modulated type of communication network including local and remote phone line extensions and being further adapted to be responsive to either incoming or outgoing phone ringing signals to properly control the receivers and transmitters as required for the phone ringing operations.

Still another object of the invention is to provide a simplified form of voice operated switching system for a communication network providing for the use of electronic switching operations and electronic locking of the switching operations to obtain quick and reliable communication that is practically indistinguishable from conventional duplex communication operation except that both the receiver and transmitter of a station may not be operated simultaneously.

A feature of the invention is the provision of a voice frequency controlled electronic switch system which is operative in response to the voice frequencies to be transmitted to thereby turn the transmitter on and the receiver off, the system including adjustable means to delay turning off the transmitter after voice frequencies cease to thereby prevent switching after each spoken word. The system further includes two additional delay means to delay turning the transmitter or the receiver on, as the case may be, to prevent simultaneous operation of both the transmitter and the receiver.

Another feature of the invention is the provision of a single electronic switch circuit having two steady state conditions, a first normal steady state for standby receiving operation which is responsive to turn the receiver on and the transmitter off and a second steady state as controlled by voice frequencies to be transmitted which is responsive to turn the transmitter on and the receiver off, together with a second electronic locking circuit responsive to a received carried signal for locking the electronic switch in the first normal steady state in a condition for receiving.

Yet another feature of the invention as applied to a frequency modulated communication network between local and remote phone lines is the provision of local and remote phone ringing means including relay means responsive to a local ringing voltage to operate the voice operated switching system to thereby turn the transmitter on and the receiver off and at the same time shift the carrier center frequency of the transmitter, and also including carrier shift relay means responsive to a received signal of shifted carrier frequency to lock the voice operated switch in the receiving or standby condition with the receiver on and the transmitter off while at the same time connecting a ringing voltage to the local phone line.

Figure 2:
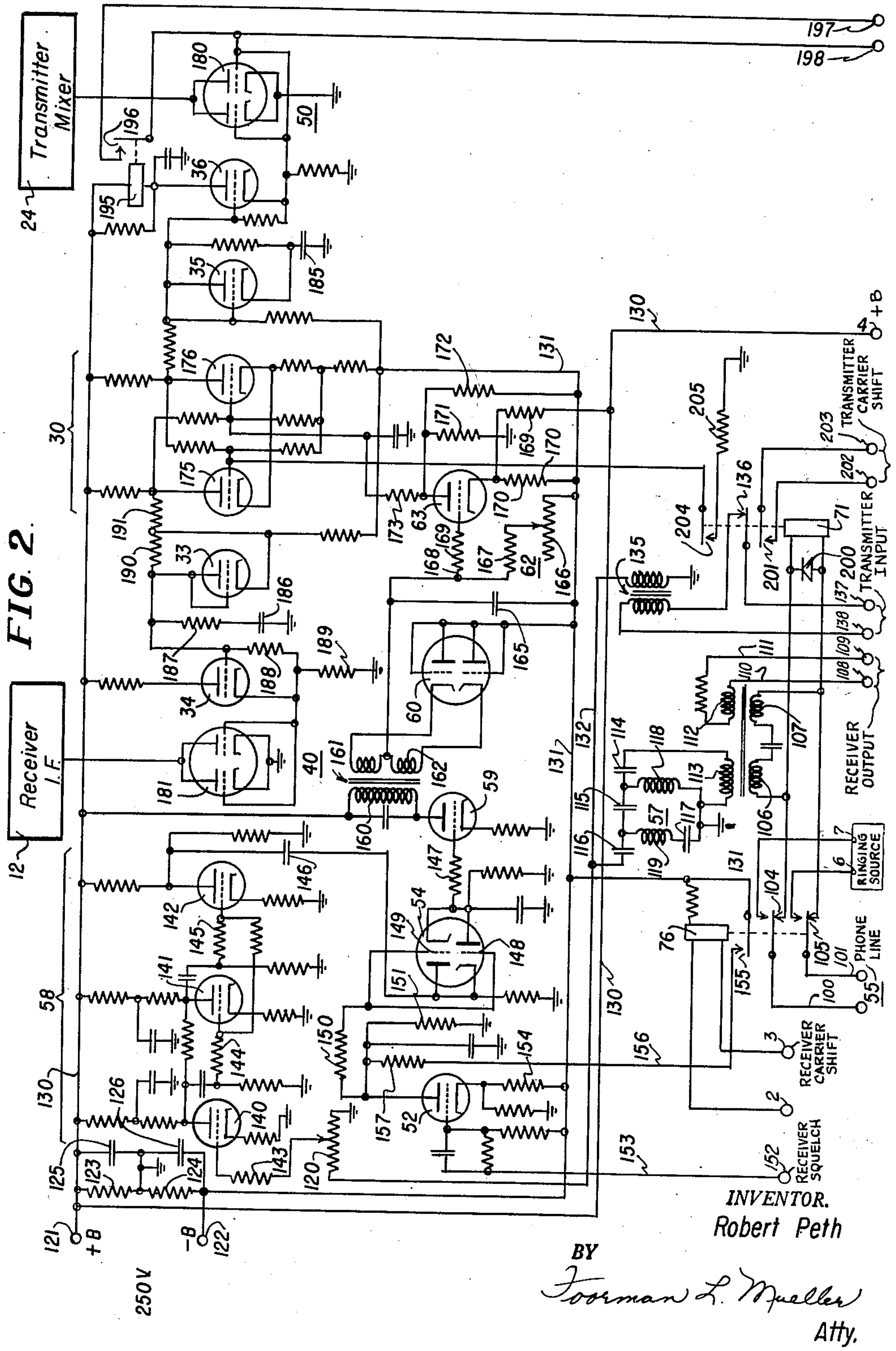

Further objects and features and the attending advantages of the invention will be apparent with reference to the following specifications and drawings in which Fig. 1 is a block diagram of a frequency modulated communications network including the voice operated switching system of the invention, the switching system being enclosed by the dotted lines;

Fig. 2 is a schematic wiring diagram of the voice operated switching system of the invention.

To practice the invention, an electronic switch of the type having two steady state conditions of operation, including a first normal condition and a second controlled condition responsive to an external control voltage, is connected to electronically turn the receiver on and the transmitter off in the first or standby receiving condition, and the receiver off and the transmitter on in the second or controlled transmitting condition. The external control voltage for the electronic switch is derived from voice frequencies to be transmitted. These voice frequencies are amplified in a manner to limit the amplified signals to a substantially constant amplitude notwithstanding their varying input amplitudes. An electronic switch locking device that is controlled by receiver squelch voltage when a carrier signal is received, is connected between the voice signals to be transmitted and the means for deriving the control voltage for the electronic switch, to lock the switch in the first or standby receiving condition when a carrier signal is received. The switch control voltage deriving means is further provided with adjustable means delaying the decay of the control voltage to prevent undesirable switch operation after each spoken word. The electronic switch is also provided with condenser charging and discharging polarized time delay circuits to delay turning on the receiver until the transmitter is turned off and to delay turning on the transmitter until the receiver is turned off to thus prevent simultaneous operation of both receiver and transmitter.

Referring to Fig. 1 of the drawings, the receiver may comprise the usual stages and components required for receiving frequency modulated waves and which include the radio frequency and converter stages 10 and 11, intermediate frequency amplifier stage 12, one or more limiter stages 13, the discriminator stage 14, the audio amplifier stage 15 and the speaker or reproducer 16. The receiver audio output may be connected to the local phone line when using the communication network with local and remote phone lines extensions and therefore, the speaker 16 would not be used under such conditions.

A squelch voltage generating stage 17 controlled by the receiver limiter stage 13 is connected to generate a positive polarity squelch voltage when a carrier signal is received to thereby permit the audio amplifier 15 and the speaker 16 to reproduce the detected audio modulation. Normally the audio amplifier 15 is muted to prevent reproduction of noise when a carrier signal is not received and squelch voltage not produced. All of the receiver stages referred to may be of standard construction except that the receiver intermediate frequency stage 12 is provided with a cathode bias voltage circuit which may make the stage inoperative to, in effect, turn the receiver off. However, the bias voltage circuit is normally short circuited to ground by the receiver control stage 40 of the voice operative switching system to be described. The receiver control stage 40 preferably includes a grid controlled electron tube made conductive by the switching system in the standby condition to thereby short circuit the receiver off bias voltage in the intermediate frequency amplifier stage of the receiver and thus provide a normal on condition for the receiver in standby operation.

The transmitter may comprise audio amplifier and audio limiting stages 20, a reactance modulator stage 21, a modulated oscillator stage 22, a crystal oscillator stage 23, a mixer stage 24 and a power amplifier final stage 25. In order to shift the carrier center frequency of the transmitter for signalling or ringing purposes to be later described, a carrier shift voltage generating circuit 26 is connected to the reactance modulator 21 in a manner to shift the transmitter carrier center frequency when desired by applying a predetermined direct current voltage to a control portion of the modulator circuit 21. The transmitter stages may include standard circuits except that the transmitter mixer stage is provided with a transmitter "off" bias voltage circuit which makes the mixer stage inoperative to thereby turn the transmitter "off." During the transmission period the transmitter off bias voltage is short circuited to ground through the then conductive transmitter control stage 50 of the voice operated switching system in a manner similar to that described in connection with the receiver control stage 40. However, in the normal standby condition of the voice operated switching system, the grid controlled electron tube of the transmitter control stage 50 is not conductive so that the transmitter mixer stage 24 is inoperative and the transmitter is in the off condition.

The voice operated switching system as shown to be enclosed by the dotted lines of Fig. 1 of the drawings comprises basically an electronic switch stage 30 which may comprise two grid controlled electron tubes connected in an Eccles-Jordan flip flop circuit having two definite conditions of operation which may be switched in the very short time of about 100 microseconds. In the normal standby condition switch 30 assumes a steady state condition which applies a positive voltage to line 31 to maintain the receiver control tube 40 conductive in a normal receiver on position. At the same time a negative voltage is applied in line 32 to maintain the transmitter control tube 50 non-conductive and thus supply bias voltage to the transmiter mixer 24 in a manner to turn the transmitter off. When the electronic switch 30 first assumes or returns to the standby state referred to above, the time constant circuit 33 delays the application of positive voltage from line 31 to the driver stage 34 of the receiver control stage 40 for about 25 milliseconds to assure that the transmitter is turned off before the receiver is turned on.

Similarly, when the electronic switch 30 is switched to the transmit steady state condition, a positive voltage is applied in line 32 and delayed for about 250 microseconds by the time constant delay stage 35 and then applied to the driver stage 36 to make the transmitter control stage 50 conductive to short circuit to ground the transmitter off bias voltage and turn the transmitter on. At the same time a negative voltage is applied in line 31 to make the receiver control stage 40 non-conductive and thus apply receiver off bias voltage to the receiver intermediate frequency stage to turn the receiver off. Both of the time delay circuits 33 and 35 are polarized so that only the application of a positive voltage to turn on the receiver or transmitter by their respective control circuits is delayed, there being no delay in the application of the negative voltage to turn off the receiver or transmitter as the case may be.

The two steady state conditions of the electronic switch 30 are adapted to be controlled or switched from the normal standby condition by voice frequencies to be transmitted. Assuming that no carrier or voice signals are received, the squelch voltage generated by the receiver squelch stage 17 is less positive and is connected by line 51 to the squelch amplifier stage 52 of the voice operated switching system which is thus made non-conductive to apply a positive voltage to line 53 to maintain conductive the switch lock-out stage 54 and unlock the system. Voice signals to be transmitted originate in the phone line 55 and pass through the input stage 56, the high pass filter 57 to eliminate spurious low frequency responses, and an audio amplifier 58 to the normally conductive switch lock-out stage 54. Voice signals passed through the lock-out stage 54 are further amplified by the amplifier stage 59 and are rectified by the rectifier 60 to produce a voice responsive bias voltage of positive polarity in line 61. Development of voice bias voltage in line 61 is almost instantaneous but its decay upon cessation of voice frequencies is delayed by an adjustable delay filter 62 which is variable to provide a decay delay from 30 to 700 milliseconds.

Such delay is necessary in order to prevent the voice controlled switch from switching after each spoken word and an adjustment providing for a voice bias voltage decay delay of about 100 to 200 milliseconds is usually satisfactory. The positive polarity voice bias voltage is amplified by the bias amplifier tube 63 which produces a negative voltage at its output which is applied as an external control voltage to the electronic switch 30 in a manner to cause the normally conducting tube in the standby condition of the electronic switch to become non-conductive and to flip the switch to turn the transmitter on and the receiver off in the manner previously described. Upon cessation of the voice frequencies and after a decay delay interval determined by the delay means 62, the negative polarity external control voltage is removed from the electronic switch 30 which thereupon switches back to the normal standby steady state with the receiver on and the transmitter off.

When a carrier is received before voice frequencies are to be transmitted, the squelch voltage developed in the receiver squelch stage becomes more positive making the squelch amplifier stage 52 conductive to apply a more negative voltage to make the switch lock-out stage 54 non-conductive with the switching system in the standby or receiving condition. This prevents the passage of any voice frequencies from the line 55 to the voice frequency rectifier and thus prevents the formation of a control voltage to operate the electronic switch. In such a manner the switching system is locked in the normal standby receiving condition by the receiver squelch voltage when a carrier signal is received, assuming that the carrier signal is received before voice frequencies to be transmitted are developed in phone line 55.

The communication system as described is particularly useful in connecting local phone lines with remote phone lines by a frequency modulated carrier current arrangement and it should be understood that the antenna 65 may actually comprise a bandpass filter coupling network to a power line or the like. In order to provide for incoming and outgoing ringing voltage arrangement for local and remote phone line signalling, the voice operated switching system may include the following described circuits, also shown in block outline in Fig. 1 of the drawings.

When an alternating current outgoing ringing voltage is developed in the local phone line 55, it is rectified by the ringing rectifier 70 to energize the ringing relay 71. The energization of the ringing relay 71 is effective to apply a grounding connection in line 72 to cause the normally non-conducting tube of the electronic switch 30 in the standby condition to become conductive to flip the switch and switch the receiver off and the transmitter on. At the same time the transmitter carrier shift stage 26 is energized through line 73 to shift the carrier center frequency for producing an incoming ringing signal at a remote station in a manner to be described. In addition, the energization of the ringing relay, disconnects the transmitter voice input through the connections diagrammatically shown by line 74.

An incoming ringing signal results when the center frequency of the received carrier is shifted to produce a direct current voltage in line 75 from the receiver discriminator 14, assuming the system to be in a standby condition with the receiver on. The voltage in line 75 thus developed is of sufficient magnitude to energize the carrier shift relay 76. When the carrier shift relay 76 is energized an alternating current ringing voltage is connected to the local phone line ringing circuit 77. At the same time a negative voltage is supplied in line 78 to the switch lock-out stage 54 to lock the receiver on and the transmitter off. Also the carrier shift relay 76 operates through line 79 to disconnect the local phone line from the switch input circuits and this together with the application of the negative voltage to the switch lock-out stage prevents any possibility of ringing voltage or relay transients causing an undesired operation of the voice operated switching circuit.

Reference is now made to Fig. 2 of the drawings for a detailed description of the voice frequency responsive switching system including all of the stages and circuits enclosed by the dotted lines in the block outline of Fig. 1. The phone line 55 is connected by lines 100 and 101 through normally closed relay contacts 104 and 105 of the carrier shift relay 76 and to the windings 106 and 107 respectively of the transmitter voice input transformer and the receiver audio output transformer. In such arrangement, the phone line 55 may be connected to a combined microphone and reproducer. The receiver audio output is applied to terminals 108 and 109 and through lines 110 and 111 to the transformer winding 112. The transmitter transformer winding 113 is connected to the sensitivity control 120 of the voice operated switching system through the high pass filter 57 comprising condensers 114, 115, 116 and 117 together with inductors 118 and 119 arranged in a circuit to attenuate frequencies below 300 cycles per second to thus avoid improper operation of the voice control switch by spurious low frequency responses in the phone line.

Before proceeding with the detailed description, it is believed that an understanding of the invention will be facilitated if it is pointed out that the direct current power supply for energizing the various tubes and circuits furnishes direct current at a potential of about 250 volts across terminals 121 and 122 and that a voltage divider comprising resistors 123, 124 and filter condenser 125 and 126 divides the voltage to chassis ground such that a direct current of about 125 volts positive polarity is applied to the B+ line 130 and of about 125 volts negative polarity is applied to the B— line 131 with respect to ground.

The audio signals or voice frequencies to be transmitted as passed through the high pass filter 57 are connected through line 132 and transformer 135 to the normally closed contacts 136 of the ringing relay 71 and to the transmitter audio input terminals 137 and 138. Portions of the same voice frequencies to be transmitted appear across the sensitivity control 120 as previously described and are applied to the multi-stage resistance coupled audio amplifier 58 including the grid controlled tubes 140, 141 and 142. The resistance coupled amplifier is conventional except that amplitude limiting resisters 143, 144 and 145 are inserted in the control grid circuits as shown to limit the output of the amplifier to be substantially constant for varying amplitudes of input voltages.

The amplified voice frequencies appearing at the plate of amplifier tube 142 are connected by the coupling condenser 146 to one plate and one cathode respectively of the switch lock-out tube 54 which is of the twin unit grid controlled type. The other plate and cathode respectively of the tube 54 are connected together and through the signal limiting resistance 147 to the control grid of the power amplifier tube 59. The connections of switch lock-out tube 54 are generally described as back to back connections and provide for continuous conduction of current from condenser 146 to tube 59 through the tube 54 when the tube 54 is biased to be conductive.

Tube 54 is normally conductive during standby operation of the switching system so long as its control grids are positive or above ground potential. The control grids 148, 149 are connected together and through the grid resistance 150 to the plate of the squelch amplifier tube 52 and to chassis ground through the plate resistor 151. So long as the squelch amplifier tube 52 is not conductive, its plate and hence the control grids 148, 149 of the switch lock-out tube 54 are at ground potential, permitting passage of voice frequencies to the audio amplifier 59. When a carrier signal is received by the receiver shown in Fig. 1, the receiver squelch voltage from the receiver squelch 17 becomes more positive and is applied to terminal 152 and through line 153 to the control grid of squelch amplifier tube 52 causing such tube to conduct from chassis ground through the plate resistance 151 and cathode resistance 154 to the B— line 131. In such manner the grids 148, 149 of switch lock-out tube 54 are made negative to prevent conduction of voice frequencies through the tube to thereby lock the voice operated switch in the standby or receiving condition with the receiver on and the transmitter off.

When the carrier shift relay 76 is energized from the receiver discriminator through the terminals 2 and 3 for incoming ringing as previously described, normally open relay contacts 155 are closed to apply a negative voltage from the B— line 131 through line 156 and the resistor 157 to the control grids of the switch lock-out tube 54 to prevent conduction of voice frequencies therethrough and lock the switch in a standby condition to prevent a possible subsequent undesired operation of the electronics switch in a manner to turn the transmitter on and the receiver off. The alternating current ringing voltage is applied to the phone lines 100 and 101 from the terminals 6 and 7 of the ringing source through the relay contacts 104 and 105, when the relay 76 is energized.

In the absence of a received carrier signal such as would furnish a squelch voltage to lock the switch lock-out tube 54, voice signals to be transmitted are amplified by amplifier 58, conducted through switch lock-out tube 54 and amplified by the final audio amplifier 59 where they appear across the primary winding 160 of the output transformer 161. The secondary winding 162 is center tapped and connected to a full wave rectifier circuit including the diode connected twin triode tube 60. The voice signals are thus rectified to produce substantially instantaneously a direct current across storage condenser 165 which can only discharge very slowly through the time delay resistance 62 including the adjustable resistor 166 and fixed resistor 167.

The adjustable resistor 166 may be adjusted to have a value providing a variable decay or discharge time for the voltage across condenser 165, varying from 30 to 700 milliseconds. The connections of the rectifier tube 60 are such that a direct current of positive polarity is obtained in line 168 and applied through the current limiting resistor 169 to the control grid of the bias amplifier tube 63 when voice frequencies are applied to the rectifier circuit. The negative terminal of the rectifier circuit is connected to the B− line 131.

The cathode of the bias amplifier tube 63 is connected to a voltage divider bias source including resistances 169 and 170 connected from the B+ line 130 to the B− line 131. Resistance 170 is much smaller than resistance 169 so that almost the entire negative voltage of the B− line is applied to the cathode of tube 63. The plate of tube 63 is connected to a voltage divider source including resistors 171 and 172 of equal value connected from the chassis ground to the B− line 131. When a bias voltage of positive polarity is developed in line 168 from rectified voice frequencies, the bias amplifier tube 63 becomes more conductive and its plate assumes a more negative polarity with respect to chassis ground. The potential of the plate of tube 63 is connected through the current limiting resistance 173 to control the electronic switch circuit 30 in a manner to be described.

The electronic switch 30 is of the Eccles-Jordan type sometimes referred to as a flip flop circuit and includes two grid controlled electron tubes 175 and 176. The connections of the circuit are such that one or the other tube is conducting heavily while its opposite number is non-conducting. In other words the circuit has two steady state conditions, one of which is a normal steady state condition while no external control signals are applied. The values of the respective grid, plate and cathode resistances for the tubes 175 and 176 are such that normally tube 176 is conducting heavily in the absence of an external control voltage and tube 175 is cut off to be non-conducting. It will be noted that the plate resistances for switch tubes 175 and 176 are connected to the B+ line 130 and their cathode resistances are connected to the B− line 131. When either of the tubes 175 and 176 conducts, its plate has a negative potential of about minus 50 volts with respect to chassis ground as distinguished from a positive potential of about 100 volts with respect to chassis ground which the plate has when the tube is not conducting.

In the absence of a negative polarity control signal through the resistance 173 from the plate of the rectified voice frequency bias amplifier tube 63 the normal condition of the switching circuit 30 is for the tube 176 to be conducting and the tube 175 to be non-conducting. The plate of tube 176 is therefore negative and this negative potential is applied to the control grid of the cathode follower driver tube 36 to cause tube 36 to be non-conductive. The transmitter control stage 50 includes the grid controlled electronic tube 180 which is connected to be required to draw grid current when conducting. In the normal or standby condition of the electronic switch circuit, the cathode follower driver tube 36 is cut off, non-conducting as described and the control grid of the transmitter control tube 180 is at ground potential which is the same potential as its cathode, therefore the transmitter control tube 180 of the transmitter control stage 50 cannot draw grid current to be conductive. As previously stated, when the transmitter control stage 50 including the tube 180 is not conductive, a transmitter bias off voltage is connected to the transmitter mixer stage 24 to maintain the transmitter off.

At the same time, during normal standby condition of electronic switch 30, the tube 175 is non-conductive and its plate has a positive potential with respect to the chassis ground. The positive potential of the plate of electronic switch tube 175 is applied to the control grid of the cathode follower driver tube 34 which is thereby made conductive to supply grid current for the grid controlled tube 181 of the receiver control stage 40. In such manner the receiver control stage 40 is made conductive during the normal or standby steady state condition of the electronic switch 30 to thereby short circuit the receiver off bias voltage in the receiver intermediate frequency amplifier stage and maintain the receiver on.

Now, assuming that a carrier is not received by the receiver and therefore voice frequencies to be transmitted can be applied through the switch lock-out tube 54 to the rectifier circuit, when such voice frequencies are thus applied, the plate of the bias amplifier tube 63, becomes more negative to apply a negative voltage to the control grid of the previously conductive switch tube 176 to cause the tube to become non-conductive. Through the conventional action of the flip flop circuit, within approximately 100 microseconds, switch tube 175 becomes conductive. The plate of switch tube 175 therefore becomes negative as the plate of switch tube 176 becomes positive with respect to chassis ground. The negative potential of the plate of switch tube 175 therefore causes the grid controlled cathode follower connected driver tube 34 to become non-conductive which, in turn, cuts off the previously conductive receiver control stage 40 to thus apply the receiver off bias voltage to the receiver intermediate frequency stage 12. This action happens substantially instantaneously and with the receiver off, no receiver squelch voltage can be developed to make the switch lock-out tube 54 non-conductive. At the same time the positive voltage on the plate of switch tube 176 is applied through the polarized delayed network including the diode connected triode tube 35 and the condenser 185, which, as soon as the condenser 185 is charged applies the positive voltage to make the grid controlled cathode follower connected driver tube 36 conductive. When the driver tube 36 conducts, the transmitted control stage 50 becomes conductive and short circuits the transmitter bias off voltage to turn the transmitter on. The charging time of the condenser 185 in the polarized delayed circuit, including the tube 35, is about 250 microseconds to assure that the receiver will be turned off before the transmitter is turned on so that simultaneous operation of both transmitter and receiver is prevented. After the switching operation described and so long as voice frequencies to be transmitted are rectified to produce the external control voltage for the electronic switch 30, the transmitter will remain on and the receiver off so that voice frequencies coupled by transformer 135 to the transmitter audio input terminals 137 and 138 will be transmitted.

When the communication ceases, after an adjustable delay of 30 to 700 milliseconds, as determined by the delay network 62 for the controlling of the discharge time of condenser 165, the negative voltage on the control grid of switch tube 176 is no longer applied and the electronic switch 30 returns to its normal or standby steady state condition with tube 176 conductive and tube 175 non-conductive. The plate of tube 176 therefore again becomes negative with respect to chassis ground and tubes 36 and 180 are immediately cut-off to turn the transmitter off. At the same time as the plate of tube 175 again becomes positive, the previously negatively charged condenser 186 is discharged through the two parallel discharge paths, including a first path through resistors 187, 188 and 189 and a second path through resistors 190 and 191. Tubes 34 and 181 thereafter become conductive to turn the receiver on. The discharge time for condenser 186 is approximately 25 milliseconds and is desirable to assure that the transmitter is turned off before the receiver is turned on. The timing condenser 186 was previously charged negatively during the switching interval when the plate of switch tube 175 became negative. The condenser 186 charged substantially instantaneously through the low impedance path formed by the polarized diode connected triode tube 33. When again turning the receiver on, the polarized diode 33 cannot conduct the discharge current of the timing condenser 186 which therefore must discharge through the timing resistances as previously described.

When the driver tube 36 conducts to turn the transmitter on, a relay 195 in its plate circuit is energized to close the normally open relay contacts 196 for establishing a circuit to terminals 197 and 198 to a transmitter "on" indicating light (not shown).

If it is desired to produce a ringing voltage at a remote station, an alternating current ringing voltage is connected to the local phone line 55 which signal is rectified by the rectifier 200 to energize ringing relay 71. When the ringing relay 71 is energized, the normally open ringing relay contacts 201 are closed to connect a circuit to terminals 202 and 203 for energizing the transmitter carrier shift circuit 26 to shift the carrier center frequency of the transmitter and actuate the carrier shift relay at a remote receiving station. The carrier shift relay at the remote station is connected in a circuit identical in operation to that of carrier shift relay 76 of the local station as previously described. The energization of ringing relay 71, also opens the normally closed contacts 136 to disconnect any modulating voice frequency from the transmitter audio input terminals 137 and 138. At the same time the normally open relay contacts 204 are also closed to connect the resistance 205 from the chassis ground to the control grid of switch tube 175 causing switch tube 175 to become conductive and switch tube 176 to become non-conductive to switch the receiver off and the transmitter on in the manner described. This condition exists for as long as an outgoing ringing voltage is applied to the telephone line.

In the foregoing, the voice operating switching system for use with communication systems of the automatic simplex type including a plurality of communications stations each having a receiver and transmitter tuned to the same frequency has been described. A switching system is used with receivers developing audio squelch control voltages from received carrier signals which operates to prevent simultaneous operation of both transmitter and receiver. When a carrier signal developing a squelch voltage is received at the local station, the local receiver is locked on and the local transmitter locked off. When a carrier signal is not received, the switching system is unlocked and may respond to voice frequencies to switch the receiver off and the transmitter on by an electronic switch network that has a total maximum operating time less than 3 milliseconds. A time of 3 milliseconds is estimated as being the expected maximum propagation time of the communication network neglecting any phone line delays. At the end of a communication, and after a delay adjustable from 30 to 700 milliseconds, to prevent switching after each spoken word, the electronic switch reverts to the standby condition, turning the transmitter off and the receiver on. The speed of operation is so smooth and effective with the system of the invention, that operations comparable to duplex systems are obtained. It will be noted that no relays are employed for locking the switch in the standby condition or for the actual switching so that the system does not generate any transient responses and is therefore more reliable in operation.

While the circuit of Fig. 2 has been described as using triode tubes, either triode or diode connected for the various circuit functions, it should be understood that other types of tubes and circuit arrangements to function substantially as described may be used.

Various modifications may be made within the spirit of the invention and the scope of the appended claims. For example, the switching system, while particularly described for controlling a frequency modulated type of communication network, may also be used for controlling other types of networks such as an amplitude modulated network or the like.

I claim:

1. In a frequency modulated communication network adapted to connect local and remote phone lines and including local and remote transmitters and receivers tuned to the same predetermined carrier center frequency, with said receivers providing a first control voltage in response to the reception thereby of a carrier of said predetermined frequency, and a second control voltage in response to the reception thereby of a carrier shifted with respect to said predetermined frequency, and said transmitters including means for shifting the frequency thereof in response to actuation of a circuit thereof, the voice operated switching system including in combination, an electronic switch circuit, said circuit having two steady state conditions of operation including a first normal condition and a second controlled condition, means interconnecting said switch circuit and said local transmitter and local receiver for rendering the receiver operative and the transmitter inoperative when said switch is in said first condition and for rendering the receiver inoperative and the transmitter operative when said switch is in said second condition, switch circuit control means connected to the local phone line and activated by the voice frequencies applied thereto to provide a third control voltage, means applying said third control voltage to said switch circuit to switch the same to said second controlled condition, said switch circuit control means including a portion responsive to the first control voltage from said local receiver to inactivate said control means, local phone line ringing means including first relay means connected to said local receiver and responsive to the second control voltage therefrom to operate said ringing means, said first relay means being connected to said switch control means to inactivate the same when said local ringing means is operated, and remote phone line ringing means including second relay means connected to the local line and to the local transmitter and energized by ringing voltage in the local phone line to actuate the carrier shift circuit of the local transmitter, said second relay means being connected to said switch circuit to operate the same to the controlled position for transmitting the shifted carrier.

2. The invention of claim 1 wherein said switch circuit control means includes delay means for retaining said third control voltage for holding said switch circuit in said second controlled condition thereof for a predetermined time interval after the voice frequencies in the local phone line cease.

3. The invention of claim 1 wherein said switch circuit control means includes adjustable means for controlling the decay of said third control voltage for variably delaying the operation of said switch circuit from said second controlled condition to said first normal condition thereof after the voice frequencies in the local phone line cease.

4. The invention of claim 1 wherein the interconnecting means includes delay means operative when said switch circuit changes from said second controlled condition to said first normal condition to delay rendering the receiver operative until after the transmitter is rendered inoperative.

5. The invention of claim 1 wherein the interconnecting means includes delay means operative when said switch circuit changes from said first normal condition to said second controlled condition to delay rendering the transmitter operative until after the receiver is rendered inoperative.

6. In a frequency modulated communication network adapted to connect local and remote phone lines and including local and remote transmitters and receivers tuned to the same predetermined carrier center frequency, with said receivers providing a first control voltage in response to the reception thereby of a carrier of said predetermined frequency, and a second control voltage in response to the reception thereby of a carrier shifted with respect to said predetermined frequency, the voice operated switching system including in combination, an electronic switch circuit, said circuit having two steady state conditions of operation including a first normal condition and a second controlled condition, means interconnecting said switch circuit and said local transmitter and local receiver for rendering the receiver operative and the transmitter inoperative when said switch is in said first condition and for rendering the receiver inoperative and the transmitter operative when said switch is in said second condition, switch circuit control means connected to the local phone line and activated by the voice frequencies applied thereto to provide a third control voltage, means applying said third control voltage to said switch circuit to switch the same to said second controlled condition, said switch circuit control means including a portion responsive to the first control voltage from said local receiver to inactivate said control means, and local phone line ringing means including first relay means connected to said local receiver and responsive to the second control voltage therefrom to operate said ringing means, said first relay means being connected to said switch control means to inactivate the same when said local ringing means is operated.

7. In a frequency modulated communication network adapted to connect local and remote phone lines and including local and remote transmitters and receivers tuned to the same predetermined carrier center frequency, with said receivers providing a first control voltage in response to the reception thereby of a carrier of said predetermined frequency, and said transmitters including means for shifting the frequency thereof from said predetermined frequency in response to actuation of a circuit thereof, the voice operated switching system including in combination, an electronic switch circuit, said circuit having two steady state conditions of operation including a first normal condition and a second controlled condition, means interconnecting said switch circuit and said local transmitter and local receiver for rendering the receiver operative and the transmitter inoperative when said switch is in said first condition and for rendering the receiver inoperative and the transmitter operative when said switch is in said second condition, switch circuit control means connected to the local phone line and activated by the voice frequencies applied thereto to provide a third control voltage, means applying said third control voltage to said switch circuit to switch the same to said second controlled condition, said switch circuit control means including a portion responsive to the first control voltage from said local receiver to inactivate said control means, and remote phone line ringing means including second relay means connected to the local line and to the local transmitter and energized by ringing voltage in the local phone line to actuate the carrier shift circuit of the local transmitter, said second relay means being connected to said switch circuit to operate the same to the controlled position for transmitting the shifted carrier.

8. In a communication network including remote and local stations each having a transmitter and a receiver, and with the receiver of each station having squelch means responsive to a received carrier signal for developing a receiver squelch voltage, the voice frequency responsive switching system for each station including, electronic switch means including first and second vacuum tubes connected in a flip-flop circuit wherein each tube when conducting immediately renders the other tube non-conducting, said circuit being biased to normally hold said first tube conducting and said second tube non-conducting and operating upon application of an external control voltage thereto to render said second tube conducting and said first tube non-conducting, means individually coupling said first and second tubes respectively to said station receiver and said station transmitter for rendering the receiver and transmitter operative when the tube coupled thereto is conducting, whereby the receiver is normally rendered operative and the transmitter is normally inoperative, circuit means responsive to voice frequencies to be transmitted to develop said external control voltage for said switch circuit, means to apply said control voltage to said switch circuit, and means connected to the station receiver and responsive to the station receiver squelch voltage to modify the voice frequency responsive means and prevent the development of said external control voltage when a carrier signal is received by the station receiver.

9. In a communication network including remote and local stations each having a transmitter and a receiver, and with the receiver of each station having squelch means responsive to a received carrier signal for developing a receiver squelch voltage, the voice frequency responsive switching system for each station including, electronic switch means including first and second vacuum tubes connected in a flip-flop circuit wherein each tube when conducting immediately renders the other tube non-conducting, said circuit being biased to hold said first tube conducting and said second tube non-conducting and operating upon application of an external control voltage thereto to render said second tube conducting and said first tube non-conducting, first and second means individually coupling said first and second tubes respectively to said station receiver and said station transmitter for rendering the receiver and transmitter operative when the tube coupled thereto is conducting, whereby said receiver is normally rendered operative and said transmitter is normally inoperative, said first and second coupling means including delay means for delaying the operation of said receiver and transmitter for predetermined periods of time after said first and second tubes conduct respectively, circuit means responsive to voice frequencies to be transmitted to develop said external control voltage for said switch circuit, means to apply said control voltage to said switch circuit, and means connected to the station receiver and responsive to the station receiver squelch voltage to modify the voice frequency responsive means and prevent the development of said external control voltage when a carrier signal is received by the station receiver.

10. In a communication network including remote and local stations, each station having a transmitter and a receiver, and with the receiver of each station having squelch means responsive to a received carrier signal for developing a receiver squelch voltage, the voice frequency responsive switching system for each station including, an electronic switch circuit operating between two steady state conditions, a first normal steady state condition and a second controlled steady state condition as obtained in response to the application to the switch circuit of an external switch circuit control voltage, means connecting the switch circuit to the station transmitter and receiver to turn the station transmitter off and the station receiver on in response to the first normal condition of said switch circuit and to turn the station receiver off and the station transmitter on in response to the second controlled condition of said switch circuit, means responsive to voice frequencies to be transmitted to develop said external control voltage for said switch circuit, means for applying said voice frequencies to said circuit means including a pair of triode tubes connected to conduct voltages of opposite polarities, and means connected to the station receiver and to the grids of said triode tubes for applying thereto the station receiver squelch voltage, said squelch voltage rendering said triode tubes non-conducting to interrupt the voice frequencies and prevent the development of said external control voltage therefrom when a carrier signal is received by the station receiver.

11. In a communication network including remote and local stations, each station having a transmitter and a receiver, and with the receiver of each station having squelch means responsive to a received carrier signal for developing a receiver squelch voltage, the voice frequency responsive switching system for each station including, an electronic switch circuit operating between two steady state conditions, a first normal steady state condition and a second controlled steady state condition as obtained in response to the application to the switch circuit of an external switch circuit control voltage, means connecting the switch circuit to the station transmitter and receiver to turn the station transmitter off and the station receiver on in response to the first normal condition of said switch circuit and to turn the station receiver off and the station transmitter on in response to the second controlled condition of said switch circuit, rectifier means responsive to voice frequencies to be transmitted to develop said external control voltage for said switch circuit, means for applying said voice frequencies to said circuit means including a pair of triode tubes connected to conduct voltages of opposite polarities, and means connected to the station receiver and to the grids of said triode tubes for applying thereto the station receiver squelch voltage, said squelch voltage rendering said triode tubes non-conducting to interrupt the supply of voice frequencies to said rectifier means when a carrier signal is received by the station receiver, said rectifier means including condenser means across which said external control voltage is developed and adjustable resistance means for controlling the discharge of said condenser means, whereby said electronic switch circuit will remain in the second controlled condition after voice frequencies cease for a period of time governed by the adjustment of said resistance means.

12. In a communication network including remote and local stations each having a transmitter and a receiver, and with the receiver of each station having squelch means responsive to a received carrier signal for developing a receiver squelch voltage, the voice frequency responsive switching system for each station including, electronic switch means including first and second vacuum tubes connected in a flip-flop circuit wherein each tube when conducting immediately renders the other tube non-conducting, said circuit being biased to hold said first tube conducting and said second tube non-conducting and operating upon application of an external control voltage thereto to render said second tube conducting and said first tube non-conducting, first and second means individually coupling said first and second tubes respectively to said station receiver and said station transmitter for rendering the receiver and transmitter operative when the tube coupled thereto is conducting, whereby said receiver is normally rendered operative and said transmitter is normally inoperative, means responsive to voice frequencies to be transmitted to develop said external control voltage for said switch circuit, means for applying said voice frequencies to said circuit means including a pair of triode tubes connected to conduct voltages of opposite polarities, and means connected to the station receiver and to the grids of said triode tubes for applying thereto the station receiver squelch voltage, said squelch voltage rendering said triode tubes non-conducting to interrupt the voice frequencies and prevent the development of said external control voltage therefrom when a carrier signal is received by the station receiver.

13. In a communication network including remote and local stations each having a transmitter and a receiver, and with the receiver of each station having squelch means responsive to a received carrier signal for developing a receiver squelch voltage, the voice frequency responsive switching system for each station including, electronic switch means including first and second vacuum tubes connected in a flip-flop circuit wherein each tube when conducting immediately renders the other tube non-conducting, said circuit being biased to normally hold said first tube conducting and said second tube non-conducting and operating upon application of an external control voltage thereto to render said second tube conducting and said first tube non-conducting, first and second means individually coupling said first and second tubes respectively to said station receiver and said station transmitter for rendering the receiver and transmitter operative when the tube coupled thereto is conducting, said first and second coupling means including delay means for delaying the operation of said receiver and transmitter for predetermined periods of time after said first and second tubes conduct respectively, said second coupling means including cathode follower amplifier means and cathode follower biasing means for controlling the operation of the transmitter, circuit means responsive to voice frequencies to be transmitted to develop said external control voltage for said switch circuit, means to apply said control voltage to said switch circuit, and means connected to the station receiver and responsive to the station receiver squelch voltage to modify the voice frequency responsive means and prevent the development of said external control voltage when a carrier signal is received by the station receiver.

References Cited in the file of this patent

UNITED STATES PATENTS

| | | |
|---|---|---|
| 1,678,672 | Espenschied | July 31, 1928 |
| 1,691,076 | Mathes | Nov. 13, 1928 |
| 1,970,423 | Frink | Aug. 14, 1934 |
| 2,144,936 | Rochow | Jan. 24, 1939 |
| 2,157,234 | Heisner | May 9, 1939 |
| 2,273,945 | Fisher | Feb. 24, 1942 |
| 2,306,121 | Hagen | Dec. 22, 1942 |
| 2,484,211 | Emling | Oct. 11, 1949 |
| 2,501,986 | Brockman | Mar. 28, 1950 |
| 2,504,008 | De Fremery | Apr. 11, 1950 |

OTHER REFERENCES

"Voice Operated Switching of Carrier Systems," Fox, Beale & Symonds, "Electronics Magazine," February 1950, vol. #23, No. 2, pages 922–95.